April 8, 1930.　　　　F. McFADDEN　　　　1,754,032
EYE EXAMINING INSTRUMENT
Filed May 9, 1927　　　5 Sheets-Sheet 5
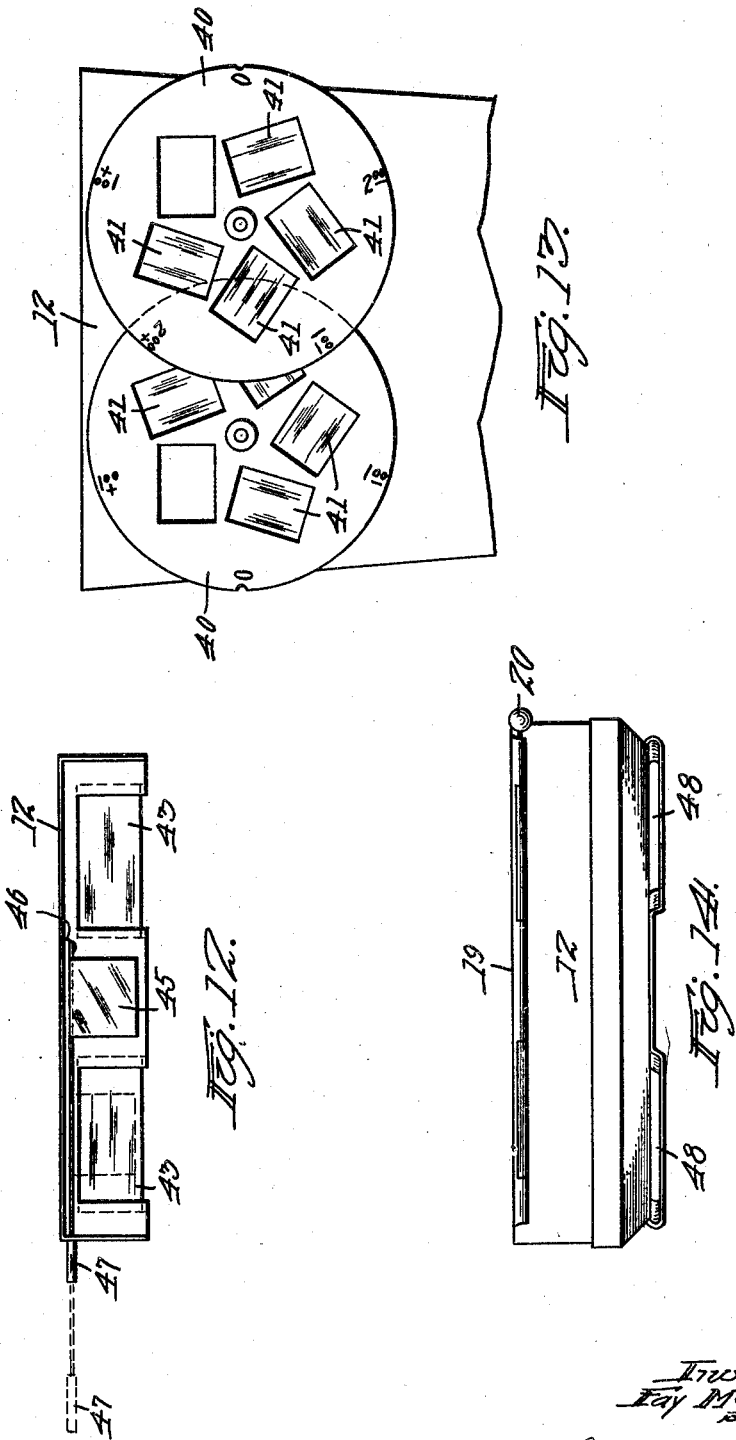

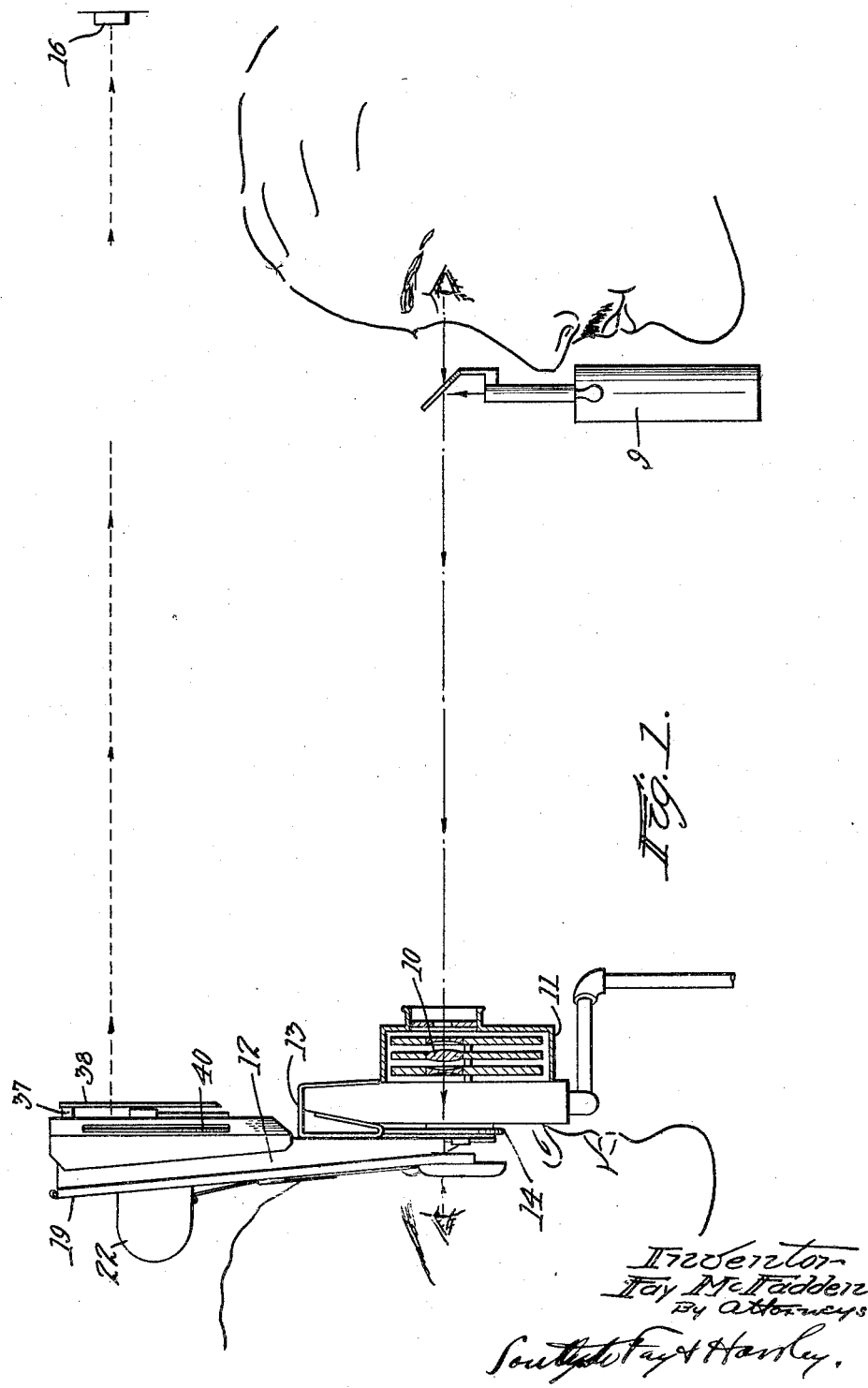

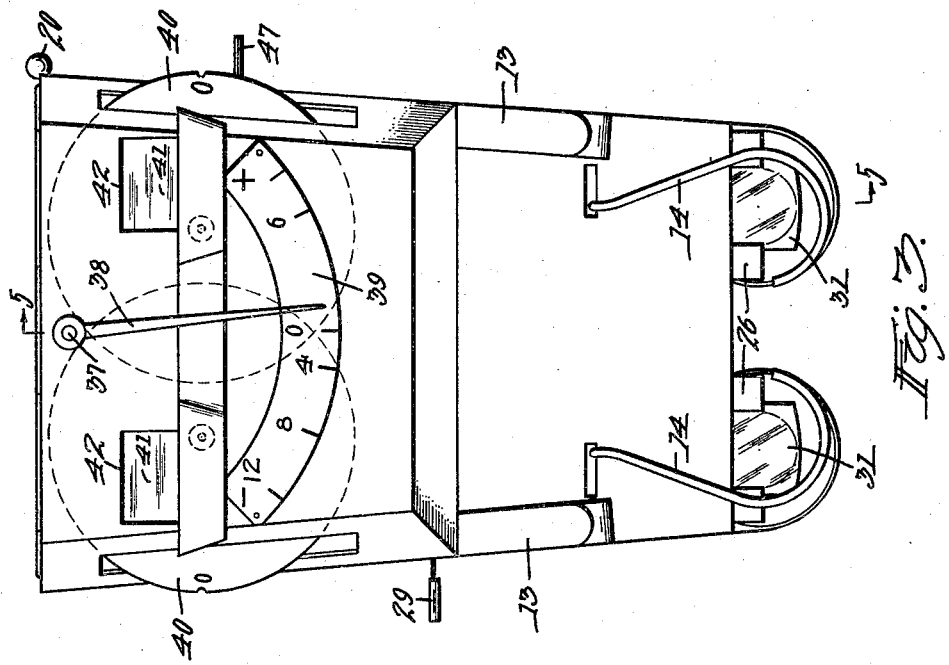
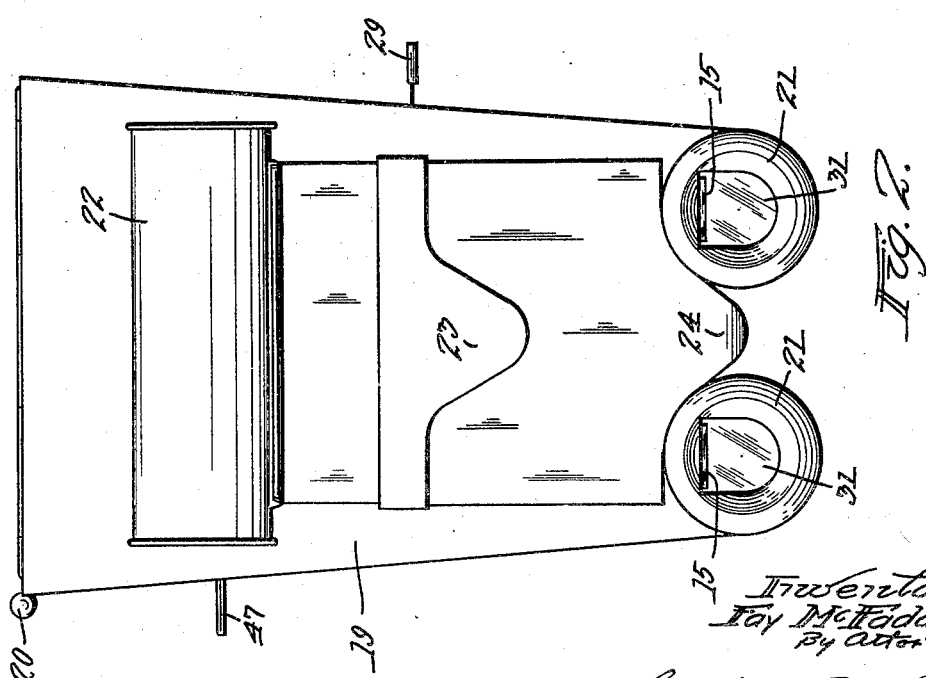

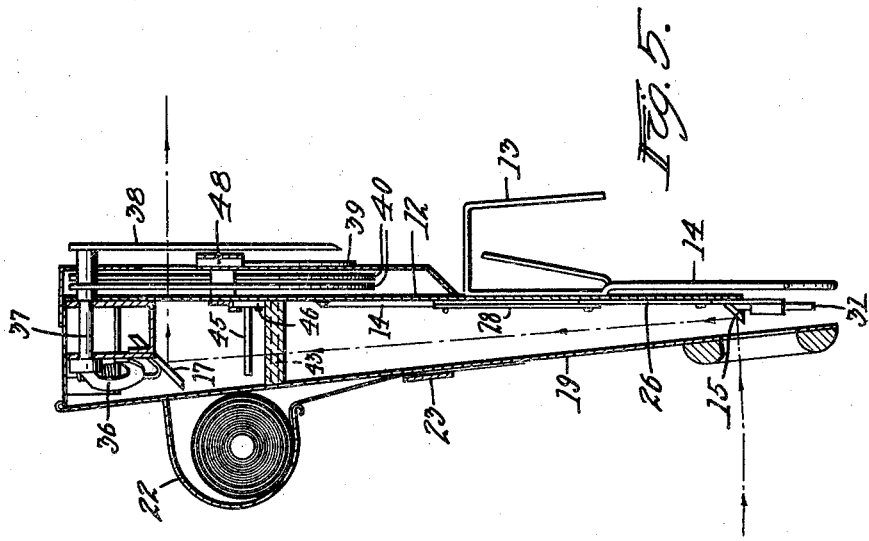

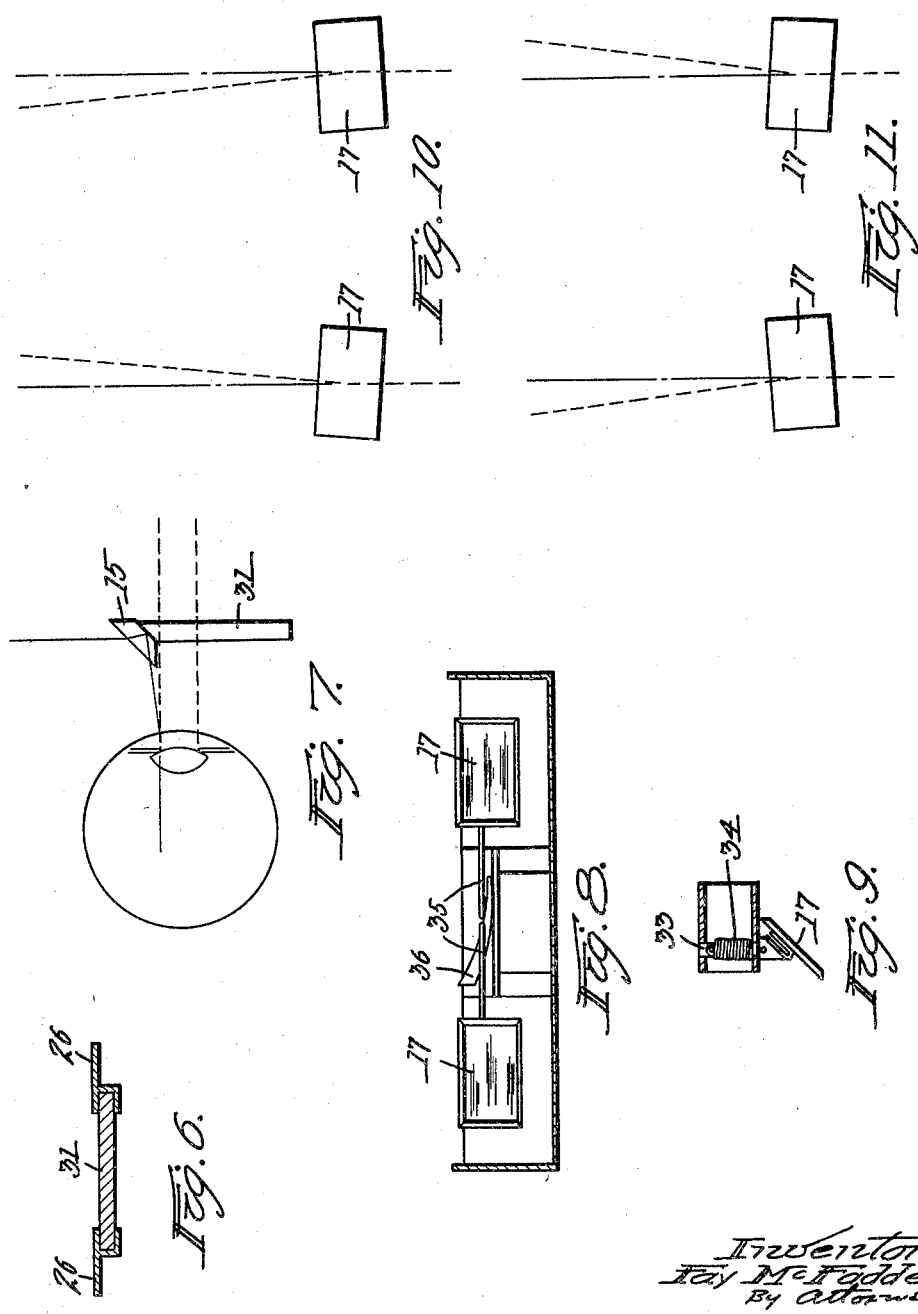

Patented Apr. 8, 1930

1,754,032

UNITED STATES PATENT OFFICE

FAY McFADDEN, OF ATHOL, MASSACHUSETTS

EYE-EXAMINING INSTRUMENT

Application filed May 9, 1927. Serial No. 189,793.

This invention relates to a device in the form of an attachment, or an addition, for use in connection with an optometer, phorometer or the like, for the purpose of avoiding some of the difficulties now encountered and chiefly to provide means whereby the patient will not be obliged to look at the refractionist, but instead will look over his head and not see him at all. This enables the latter to throw a ray of light into the pupil of the patient's eye and avoid the discontinuous attempts at accommodation necessarily made by the patient when he is looking at a point adjacent to the refractionist's head and perhaps trying to follow its motions. This part of the invention involves the use of a periscope for directing the vision of the patient to a point elevated but with his direct line of sight horizontal. It also involves means whereby the mirrors, or equivalent optical means, by which the elevation of the line of sight is secured, will be capable of being adjusted angularly in opposite directions to provide for overcoming certain defects that appear; means whereby the lenses through which the refractionist observes the eye of the patient, and which are located directly in front of the eye, can be adjusted vertically at will; means for introducing a lens into the path of light to either eye for securing certain results, and also a rotary lens holding means for subjecting each eye independently to the action of different lenses to relax accommodation, or to cause accommodation.

Other objects and advantages of the invention will appear hereinafter.

Reference is to be had to the accompanying drawings in which

Fig. 1 is a side view showing the position of the patient when the eyes are being examined with the use of an ordinary instrument and showing in edge elevation a preferred embodiment of this invention applied thereto as an attachment;

Fig. 2 is a rear view of the attachment;

Fig. 3 is a front elevation;

Fig. 4 is a rear elevation of the inside of the attachment with everything in position except that the rear wall is removed;

Fig. 5 is a sectional view on the line 5—5 of Fig. 3;

Fig. 6 is a sectional view on the line 6—6 of Fig. 4 somewhat enlarged;

Fig. 7 is a diagrammatical view showing the deflection of a beam of light and illustrating one element of the periscope;

Fig. 8 is a horizontal sectional view on the line 8—8 of Fig. 4, looking upwardly;

Fig. 9 is a sectional view on the line 9—9 of Fig. 4;

Figs. 10 and 11 are diagrammatic views showing the deflection caused by the adjustment of the two upper mirrors of the periscope toward and from each other about vertical axes;

Fig. 12 is a sectional view on the line 12—12 of Fig. 4 looking downwardly;

Fig. 13 is a view of the pair of rotary lens carriers located at the front of the instrument but with the covering plate removed; and Fig. 14 is a plan of the instrument.

The subject of this invention relates to instruments used in the examination of the refractive conditions of eyes, as well as their functions of accommodation, convergence and divergence, together with the factors of accommodation in combination with convergence and divergence. The invention is intended primarily to be used in connection with the phorometer, being instantly attachable to and detachable from that instrument.

In the use of such an instrument objectively the examiner has to throw a ray of light by means of a retinoscope 9 into the eye of the patient while trying to keep the patient looking at a stationary spot.

In Fig. 1 I have shown the operation in examining the eye of a patient in which the refractionist looks through a perforation in an inclined mirror which merely throws a ray of light along the line of vision into the eye of the patient through a series of lenses 10 or the like. Obviously it is desirable that the patient's eye should not be subjected to the necessity for accommodation of refocusing because that throws out the test and it often has to be made over again. The patient is usually requested to look straight at a spot over the ear of the refractionist with the idea that the patient will keep his eyes on that spot at all times. But the refractionist is unable to hold his head perfectly still while examining the eyes and consequently the patient is apt to follow with his eyes the motion of the refractionist's head and keep accommodating his eyes to the different positions and also even taking his eyes off the spot he is told to look at on the wall and look at the ear itself. This instrument is designed to avoid these difficulties and make it practically impossible for the patient to see any moving object but keep his eyes focused on a stationary object correctly located.

In Fig. 1 as stated above I have indicated the casing 11 and lenses 10 of an instrument for determining the condition of the eyes of a patient. A frame 12 is provided with a rest 13 and eye piece engaging devices 14 for engaging different parts of the phorometer to hold the casing upon the instrument detachably.

It is to be understood that the casing 12 can be made a part of the phorometer if desired but in either case it is intended to cooperate with it.

In use the patient and refractionist are in a position to look toward each other along substantially the same lines but there is a mirror 15 or other light deflecting means located just at the top of the line of vision of both parties. The bottom of this is so located that the refractionist can look under it into the eye of the patient while the patient is instructed to look at a spot 16 which he can do only if he looks into the mirror 15, as indicated in Fig. 7.

These two mirrors are shown at 45° and made of any kind or character or may be in the form of deflecting lenses as desired. The point is that by this periscope the patient looks at the spot 16 above the refractionist's head and his eyes are not influenced by any motions of the refractionist because he cannot see him.

The main object of the device having been explained above I will now describe the details of construction and other features of improvement as will appear.

It has been stated that this casing 12 is held in position on the phorometer by the brackets and wire holders 13 and 14 or that it can be formed as a part of the instrument. The rear of this attachment is formed by a cover 19 which is hinged to the casing 12 by a removable pin having a head 20. Ordinarily the back can be swung out to expose the parts therein and can be entirely removed by taking out this pin whenever desired.

I have shown this cover as having a pair of ordinary eye holes 21 which are squared out at the top for a purpose that will appear. I have also shown it as provided with a small casing 22 for a roll of paper and a guide 23 for holding the paper against the cover and along which the paper can be torn off to provide a projection 24 on the paper to come down between the eye pieces 21. This is for sanitary purposes so that the patient, holding his forehead against the cover, will not touch any surface the last patient has come in contact with. Behind the eye pieces 21 are the two light deflecting mirrors and lenses 15 in position to be seen by the patient through the tops of the eye pieces. They are squared out so that the patient can be told to look under the upper square edges at the mirrors.

These mirrors are mounted on the top of two lenses 31 located on two slides 26. These slides are provided with vertical guides and pins 27 which cause them to slide vertically and connected with a lever 28 and operating rod 29, the operating lever 28 being pivoted at 30 at a point midway between the two slides 26. From this it results that by the motion of the rod 29 the relative heights of these frames or slides 26 can be regulated. This is done to accommodate people who are in the habit of carrying the head on one side or for any other reasons for which it is required that one mirror be higher than the other in order that the patient may be in a natural and comfortable position while having his eyes tested. I have shown a pair of lenses 31 which are secured in stationary position just under the mirrors. In fact the mirrors preferably are secured to the tops of these lenses. It is through these lenses that the refractionist looks into the eyes of the patient while throwing a beam of light into the same, Fig. 7.

One of the mirrors of the periscope, as for example an upper mirror 17, can be mounted to swing on a vertical axis so as to provide convergency for cases in which the eyes are crossed or diverge more or less. In this case I have shown the two mirrors 17 as pivoted on vertical studs 33 and each yieldingly turned in one direction by a coil spring 34 thereon. The ends of these springs are in the form of arms 35 which project inwardly toward each other and rest on a wedge or cam 36. This cam is arc shaped and is adapted to be turned on a shaft 37 at the center of the arc. This shaft has a pointer 38 on the front of the frame by which the shaft is turned to move the arc-shaped cam and slightly turn both mirrors both inwardly or outwardly as the case may be. The pointer cooperates with a scale 39 which is provided with numerals to designate the variation from normal computed in prism power as will be understood by those skilled in the art. The results are indicated diagrammatically in Figs. 10 and 11.

A feature which can be used in connection with this instrument is a series of lenses in front of each mirror 17 which in many cases may be necessary to enable the patient to see sufficiently well at a distance, or to lessen accommodation required in thus focusing at a distance. For this purpose I provide two discs 40, each one having a series of lenses 41. These lenses are arranged so that they will come into horizontal position in front of the pair of openings 42 in the frame. The lenses for each disc are selected for a near-sighted or far-sighted person as the case may be. The different lenses of course have different powers. These discs are turned so that suitable lenses are in position in front of the eyes and the power of these lenses may be such as to cause all accommodation to be relaxed or the lens may, if desired, serve to accentuate accommodation if that is desired, a different lens of course being used for that purpose. It is to be noted that these lenses are located above the position through which the refractionist is working and entirely out of his way and he also is out of the range of vision of the patient as stated above. These lenses are used in addition to the lenses 10 shown in Fig. 1. Additional lenses can be supported in sockets 48 on the front.

There are also other features that can be added to this instrument with advantage. For example in the two periscopes can be placed two plain glasses 43, one of which may be red and the oher green in order to perform the ordinary tests to determine the relative efficiency to the eyes of a patient under the conditions under which he is being examined. This instrument affords a very simple means by which these glasses can be mounted. Furthermore a guide 44 is shown by which a vertical prism 45, mounted on a slide 46, can be moved back and forth to bring it in front of either eye. A handle 47 is shown connected with the slide for operating it. This can be used for any purpose desired.

It will be seen therefore that the operator of this instrument can fix the attention of the patient at a point at a distance over his head, and the motions of the operator will not distract the attention of the patient. Furthermore the rays coming to the patient's eyes may be modified in direction so as to bring them outwardly or inwardly from a parallel direction for the two eyes for the purposes described. In addition to the ordinary lenses of the optometer or phorometer the lenses in the rotary discs 40 can be used, thereby obviating the necessity for using a powerful drug for temporarily paralyzing accommodation.

Other features of the device have been described in full and it will be seen that this instrument affords a simple way for mounting them and using them and a compact arrangement without having them in the way of either party.

Although I have illustrated and described only a single form of the invention I am aware of the fact that modifications can be made therein by any person skilled in the art without departing from the scope of the invention as expressed in the claims.

Therefore, I do not wish to be limited to all the details of construction herein shown and described, but what I do claim is:

1. In a device of the character described, the combination with an instrument for testing the eyes having a lens through which the operator can observe the eye of the patient, of a light deflecting device immediately behind said lenses in a position for the light from the lenses to enter the eye of the patient, and means at a distance from the first light deflecting device for deflecting the vision of the patient before it reaches said lens in a parallel direction at a distance from the original line of sight.

2. In an eye testing instrument, the combination with an optometer having lenses through which the operator can observe the eyes of the patient, of light deflecting devices immediately behind said lenses and between the lenses and the patient, and means at another point for deflecting the vision of the patient from said light deflecting devices in a horizontal direction at a distance from the original line of sight.

3. In a device to be used in connection with an eye testing instrument, the combination with a pair of eye sights, each having a lens therein, of a pair of inclined mirrors, one at the top of each lens, a pair of similarly inclined mirrors located at a distance from the first named mirrors whereby the line of sight will be deflected without passing through the lenses to a parallel plane offset at a distance therefrom, and a movable member having a series of lenses therein adapted to come into the line of sight from the second mirrors to lessen the accommodation required to focus the eyes.

4. In an instrument of the character described, the combination of a pair of eye pieces, lenses in line with the eye pieces, means for simultaneously adjusting one lens up and the other down, a pair of mirrors one carried by each lens and inclined to throw the vision in a transverse direction, and a pair of mirrors in position to receive light from the first named mirrors and throw it out of the instrument along a line parallel to the line of vision.

5. In an instrument of the character described, the combination of a pair of lenses, means for simultaneously adjusting one lens up and the other down, a pair of light deflectors movable with the lenses and arranged to throw the line of vision in a transverse direction, a second pair of deflectors in position to receive light from the first named deflectors and throw it out of the instrument along a line different from the original ray of light, and means for turning the latter deflectors simultaneously toward or from each other on axes transverse to the incoming and outgoing rays of light.

6. In an instrument of the character described, the combination with a deflecting means for light coming from each eye of a patient mounted to turn on an axis transverse to the line of vision, a wedge or cam, arms projecting from said deflecting means and both engaging said wedge or cam, whereby the turning of the wedge will swing both deflecting means either toward each other or away from each other, said wedge being of arcuate shape and mounted to turn on a concentric axis, and yielding means for turning the deflecting devices in a direction to keep the arms against the wedge.

7. In an instrument of the character described, the combination with a deflecting means for light coming from each eye of a patient mounted to turn on an axis transverse to the line of vision, a wedge or cam, arms projecting from said deflecting means inwardly and both engaging said wedge or cam, whereby the turning of the wedge will swing both deflecting means either toward each other or away from each other, said wedge being of arcuate shape and mounted to turn on a concentric axis, a shaft on which the wedge is fixed centered on said axis having a pointer projecting from it at the front of the instrument, a scale on the instrument by which the amount of deflection of the pointer can be observed, and yielding means for turning the deflecting devices in a direction to keep the arms against the wedge.

8. In a device to be used in connection with an eye testing instrument, the combination with a casing and a pair of lenses, of a pair of mirrors, one at the top of each lens inclined to an angle of 45°, a pair of mirrors parallel thereto located at a distance from the first named mirrors, whereby the line of sight will be deflected to a parallel plane offset at a distance therefrom, a rotatable disc having a series of lenses therein adapted to come into the line of sight from the second mirrors to change the accommodation desired to focus the eyes, openings through the casing registering with the lenses in said discs, and means in the casing for supporting a pair of colored glasses one in the path of the rays to each of the eyes of the patient.

9. In a device to be used in connection with an eye testing instrument, the combination with a casing and a pair of lenses, of a pair of inclined mirrors behind the lenses and facing them, a pair of inclined mirrors parallel thereto located at a distance from the first named mirrors, in such position that the line of sight will be deflected to a parallel plane, a rotatable disc having a series of lenses therein adapted to come into the line of a sight from the second mirrors to change the accommodation required to focus the eye, openings through the casing registering with the lenses in said discs, a lens slidable transversely of the light rays in the instrument adapted to be placed in the path of the rays of one eye or removed thereform, and a handle connected with the last named lens for operating it from the outside of the instrument.

10. The combination with an eye testing instrument having a pair of eye pieces, of a roll of paper carried by the rear of the instrument, means for holding the paper against the instrument to receive the forehead of the patient against it, and means for tearing off the paper after each test to a line leaving a projection on the paper between the eye pieces.

In testimony whereof I have hereunto affixed my signature.

FAY McFADDEN.